(12) United States Patent
Saberan

(10) Patent No.: US 7,152,921 B2
(45) Date of Patent: Dec. 26, 2006

(54) VEHICLE SEAT

(75) Inventor: Mohammad Saberan, New Baltimore, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/920,892

(22) Filed: Aug. 18, 2004

(65) Prior Publication Data

US 2006/0061174 A1   Mar. 23, 2006

(51) Int. Cl.
*B60N 2/00* (2006.01)
(52) U.S. Cl. ............. 297/336; 297/340; 297/378.12; 297/383
(58) Field of Classification Search ............ 296/65.09, 296/65.05, 65.01, 65.13; 297/61, 334–336, 297/331, 340, 378.12, 383, 408
See application file for complete search history.

(56) References Cited

U.S. PATENT DOCUMENTS

| | | | |
|---|---|---|---|
| 4,382,629 A | | 5/1983 | Froumajou |
| 4,738,411 A | * | 4/1988 | Ahlstrom et al. .......... 244/3.15 |
| 5,195,802 A | | 3/1993 | Hayakawa et al. |
| 5,529,378 A | | 6/1996 | Chaban et al. |
| 5,738,411 A | * | 4/1998 | Sutton et al. ........... 297/378.12 |
| 5,951,104 A | | 9/1999 | Tsuchiya et al. |
| 6,010,190 A | * | 1/2000 | Downey ................... 297/340 |
| 6,089,641 A | | 7/2000 | Mattarella et al. |
| 6,196,613 B1 | | 3/2001 | Arai |
| 6,347,834 B1 | | 2/2002 | Couasnon |
| 6,371,556 B1 | | 4/2002 | Arai |
| 6,371,558 B1 | | 4/2002 | Couasnon |
| 6,513,875 B1 | | 2/2003 | Gray et al. |
| 6,568,736 B1 | | 5/2003 | Jach et al. |
| 6,655,738 B1 | | 12/2003 | Kämmerer |
| 6,676,216 B1 | | 1/2004 | Freijy et al. |
| 6,679,536 B1 | | 1/2004 | Sonnenberg et al. |
| 6,688,666 B1 | | 2/2004 | Neale et al. |
| 6,736,461 B1 | | 5/2004 | Blair et al. |
| 6,739,668 B1 | | 5/2004 | Coman et al. |
| 6,739,673 B1 | | 5/2004 | Gupta et al. |
| 6,860,564 B1 | * | 3/2005 | Reed et al. ................. 297/408 |
| 6,899,392 B1 | * | 5/2005 | Saberan et al. ............ 297/334 |
| 2002/0125753 A1 | | 9/2002 | Kammerer |
| 2003/0062759 A1 | | 4/2003 | Gupta et al. |
| 2003/0197410 A1 | | 10/2003 | Blair et al. |
| 2004/0070250 A1 | | 4/2004 | Cooley et al. |
| 2004/0075323 A1 | | 4/2004 | Blair et al. |

FOREIGN PATENT DOCUMENTS

DE    195 33 932 A1    3/1997
DE    100 47 743 A1    4/2002

\* cited by examiner

*Primary Examiner*—Milton Nelson, Jr.
(74) *Attorney, Agent, or Firm*—Brooks Kushman P.C.

(57) ABSTRACT

A vehicle seat including a seat cushion assembly, a seat back assembly, and a seat track assembly for supporting the seat cushion assembly and the seat back assembly in a vehicle. The seat cushion and seat back assemblies being movable to a stadium position such that the seat cushion and seat back assemblies are in a substantially upright position so that an area behind the seat is easily accessible.

19 Claims, 3 Drawing Sheets

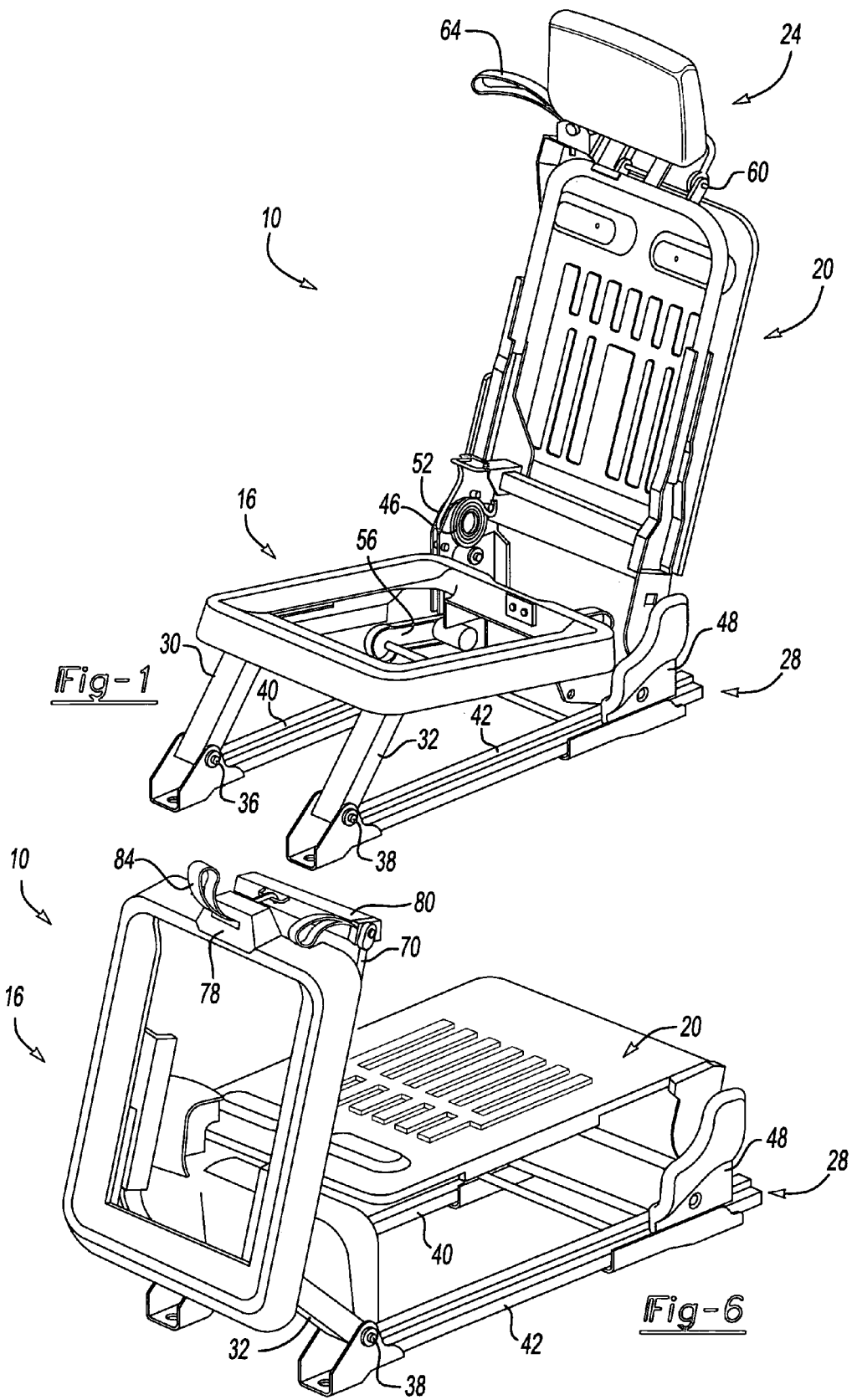

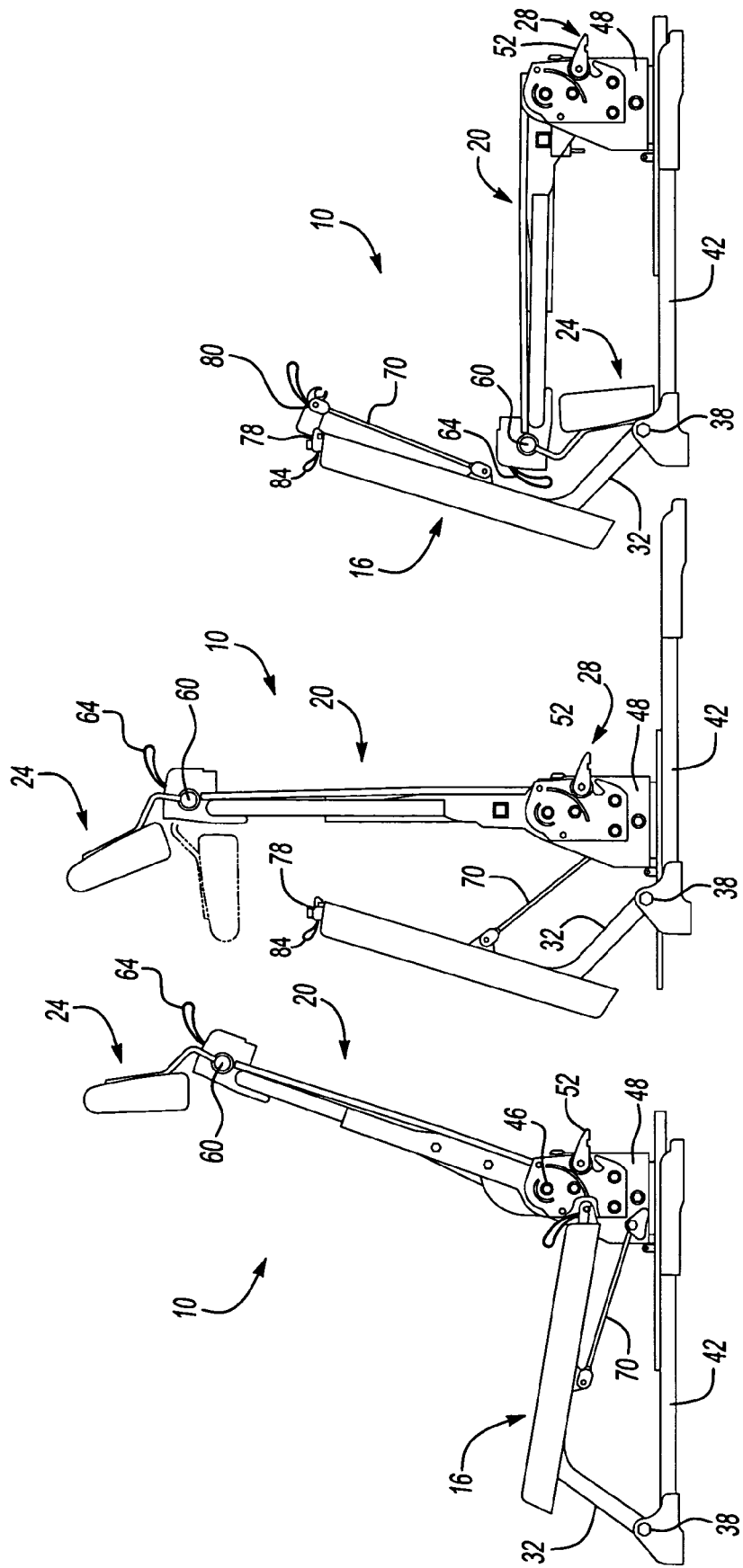

VEHICLE SEAT

BACKGROUND OF THE INVENTION

1. Field of the Invention

The present invention relates to moveable vehicle seating.

2. Background Art

A user can access the cargo area or third row seat through the second row passenger area by moving one of the seats in the second row. When accessing the cargo area or third row seat from the second row of seats, it is desirable to make doing so as easy as possible. Accordingly, there exists a need to provide a seating system which provides easy access to this cargo area or third row seat behind the second row seat. This feature can also be applicable to front passenger side seats for coupe (two door) vehicles that need an easy access to the rear seat.

SUMMARY OF THE INVENTION

It is, therefore, an object of the present invention to provide a vehicle seat that provides easy access to an area behind the seat.

The present invention contemplates a number of features for the vehicle seat, including a seat cushion assembly, a seat back assembly, and a seat track assembly for supporting the seat cushion assembly and the seat back assembly in a vehicle. A track pivot is preferably fixed proximate a forward end of the track assembly to pivotably secure a forward end of the seat cushion assembly to the track assembly such that the seat cushion assembly is pivotable about the track pivot. A track slide is preferably secured between the seat track assembly and the seat back assembly and slidable along the seat track assembly to move the seat back assembly fore and aft along the seat track assembly such that the track slide maintains securement between the seat back assembly and the seat track assembly during the fore and aft movement of the seat back assembly. With this configuration, the seat cushion and seat back assemblies are movable to a stadium position where the seat cushion assembly is pivoted upwardly about the track pivot and the seat back assembly is moved forwardly along the track assembly such that the seat cushion and seat back assemblies are in a substantially upright position so that an area behind the seat is easily accessible. Likewise, the seat is positionable to a use position where the seat cushion assembly is in a substantially horizontal plane and the seat back assembly is upright, such as to receive a passenger.

The seat can further include a recline pivot connected between the seat back assembly and the track slide to control reclining and inclining of the seat back assembly. Preferably, the seat cushion and seat back assemblies are moveable to a low flat position in which the seat cushion assembly is pivoted to an upright position about the track pivot and the seat back assembly is inclined forwardly about the track slide.

The seat can further include a headrest connected about a headrest pivot to the seat back assembly such that the headrest is pivotable about the seat back assembly. This can be used to allow the headrest to fold forwardly about the seat back assembly in the low flat position. A height of the back assembly relative to the seat track assembly is preferably approximately equal to a height of the headrest when folded forwardly in the low flat position.

The seat can further include a linkage connected between the seat cushion assembly and the track slide such that the linkage pivots the seat cushion assembly forwardly about the track pivot to the upright position with forward movement of the track slide. Preferably, the linkage slides within a seat cushion track to permit the pivoting of the seat cushion assembly about the track pivot.

The seat can further include a linkage lock for locking the linkage to the track slide and a seat cushion lock for locking the seat cushion assembly to the linkage lock. The linkage lock is preferably locked to the track slide in the use and stadium positions and unlocked from the track slide in a flat position.

The seat can further include a seat cushion lock for locking the seat cushion assembly to the linkage lock. The seat cushion lock is preferably locked to the linkage lock in the use and flat positions and unlocked from the linkage lock in the stadium position.

The above features and advantages, along with other features and advantages of the present invention, are readily apparent from the following detailed description of the invention when taken in connection with the accompanying drawings.

BRIEF DESCRIPTION OF THE DRAWINGS

FIG. 1 illustrates a perspective view of a seat in accordance with one aspect of the present invention;

FIG. 2 illustrates a side view of the seat in a use position in accordance with one aspect of the present invention;

FIG. 3 illustrates a side view of the seat in a stadium position in accordance with one aspect of the present invention;

FIG. 4 illustrates a side view of the seat in a flat position in accordance with one aspect of the present invention;

FIG. 6 illustrates a perspective view of the seat in the flat position in accordance with one aspect of the present invention.

DETAILED DESCRIPTION OF THE PREFERRED EMBODIMENT(S)

Figure 5:
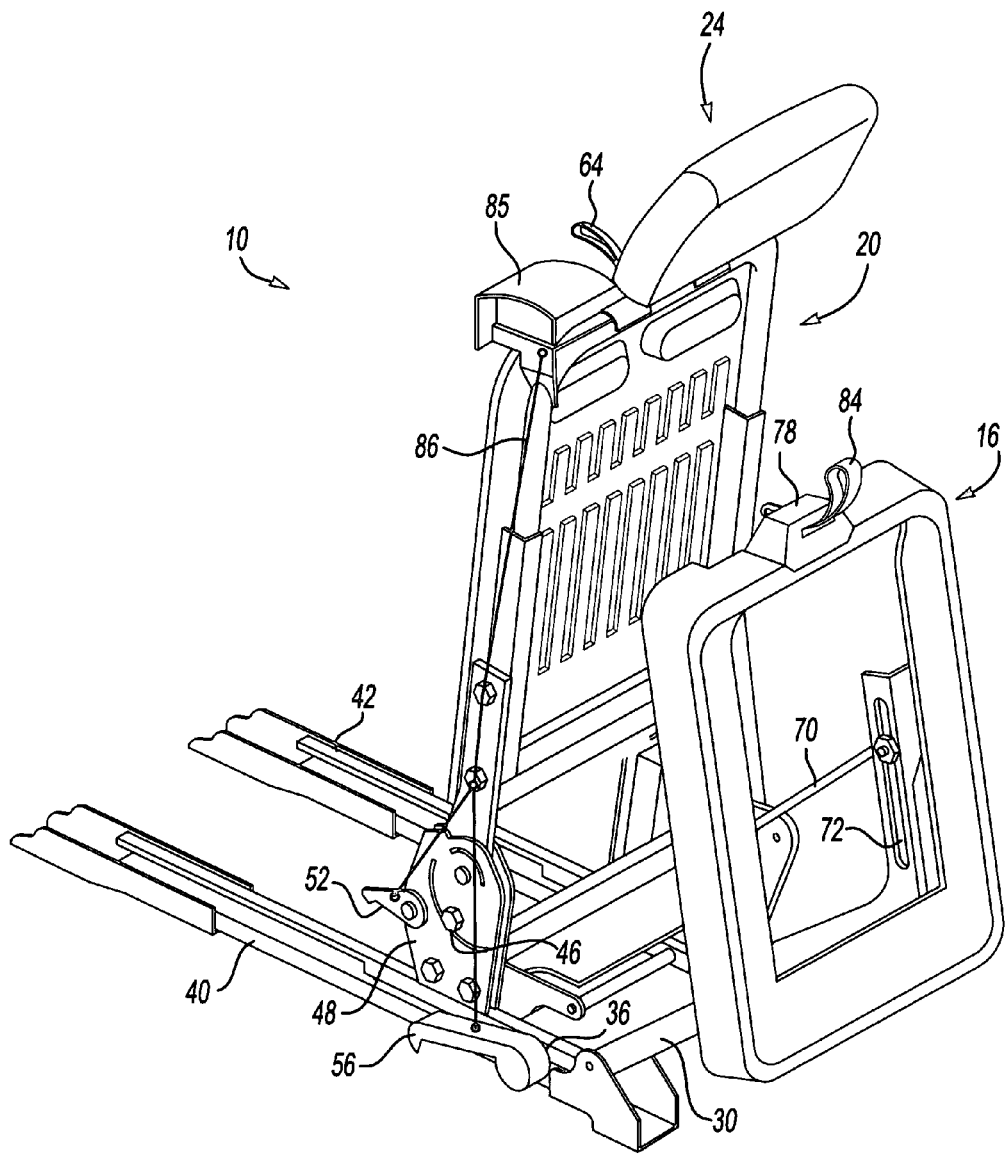
FIG. 5 illustrates a perspective view of the seat in the stadium position in accordance with one aspect of the present invention.

FIG. 1 illustrates a perspective view of a seat 10 in accordance with one aspect of the present invention. The seat 10, as described below, is reconfigurable and positionable to provide easy access to an area behind the seat 10. The seat 10 is advantageous for use in minivans, sport utility vehicles (SUVs), and the other vehicles. The present invention contemplates that the seat 10 may be employed in any number of environments and not just automotive vehicles, but also in aircraft, boats, trains, and the like. As such, the present invention is not intended to be limited to any particular environment of use. Rather, the present invention is generally applicable to any vehicle environment, whether it be the front seat, rear seat, or other seating arrangement in an automotive or non-automotive vehicle.

The seat 10 includes a seat cushion assembly 16, a seat back assembly 20, a headrest assembly 24, and a track assembly 28. The seat cushion assembly 16 includes a first leg 30 and a second leg 32 connected to respective first and second pivots 36 and 38. The pivots 36 and 38 are connected to first and second tracks or rails 40 and 42 of the track assembly 28 such that the seat cushion assembly 16 is pivotable about the pivots 36 and 38. The seat back assembly 20 connects by way of a recline pivot 46 to a track slide 48. The recline pivot 46 includes a recline lever 52 for control inclining and declining of the seat back assembly 20. The track slide 48 includes a track slide lock 56 lever to lock the track slide 48 within the first and second rails 40 and 42. The unlocked lever 56 permits the track slide 48 to slide within the track 40 and 42. Preferably, the track slide 48 is securely mounted within the rails 40 and 42 such that the track slide 48 maintains securement with the rails 40 and 42 and the seat back assembly 20 if the track slide 48 is moved fore or aft. The headrest assembly 24 connects to a headrest pivot 60 that connects to the seat back assembly 20. A headrest lever 64 controls locking and unlocking of the headrest assembly 24. As described below in more detail, the seat 10 is movable and reconfigurable into any number of positions.

FIGS. 2–4 illustrates a side view of the seat 10 in the use position (FIG. 2), in a stadium position (FIG. 3), and a flat position (FIG. 4) in accordance with various aspects of the present invention. FIGS. 5–6 illustrates additional perspective views of the seat 10 in the stadium position (FIG. 5) and the flat position (FIG. 6) in accordance with various aspects of the present invention. The seat 10 is easily moveable between each of these position so that it can be reconfigured to meet the needs of the customer.

The use position of FIGS. 1 and 2 illustrate a positioning of the seat 10 that can be used to receive a passenger. In general, the use position corresponds with the seat cushion assembly 16 being in a substantially horizontal position relative a substantially vertical or upright position of the seat back assembly 20. As noted above, the seat back pivot 46 can be used to adjust the inclination of the seat back assembly 20 to meet the needs of the passenger such that the use position may correspond with a more reclined than upright position for the seat back assembly 20 should the passenger desire a more reclined position. As such, the use position generally corresponds with position of the seat 10 to receive a passenger under normal seat usage.

The stadium position of FIGS. 3 and 5 illustrate a positioning of the seat 10 that can be used to access an area behind the seat 10. In general, the stadium position corresponds with the seat back and seat cushion assemblies 20 and 16 being in a substantially upright position, and optionally, with the seat back assembly 20 being moved to a forward end of the seat track assembly 28.

A linkage 70 is provided between the seat cushion assembly 16 and the track slide 48 to force the seat cushion assembly 16 to rotate with sufficient fore and aft movement of the track slide 48. The linkage 70 is preferably a rigid or telescoping item that slides within a seat cushion track 72. In operation, it forces the seat cushion assembly 16 to rotate forwardly about the pivots 36 and 38 from the use position to the stadium position when forward force is applied to the seat back assembly 20 that is sufficient to cause the seat back assembly 20, by way of the track slide 48, to move forwardly within the track assembly 48. Likewise, the linkage 70 is sufficient to cause the seat cushion assembly 16 to rotate rearwardly from the stadium position to the use position when rearward force is applied to the seat back assembly 20 that is sufficient to cause the seat back assembly 20, by way of the track slide 48, to move rearwardly within the track assembly 28. The use of the seat cushion track 72 allows a rigid linkage to be used while still permitting the seat back assembly 26 to be moved fore and aft when in the use position. In particular, from the use position, the track slide 48 can be unlocked and the seat back 20 moved fore and aft a distance approximately equal to the travel of the linkage 70 within the seat cushion track 72, which preferably is 100–150 millimeters, so that the position of the seat back assembly 20 can be adjusted to meet the comforts of the passenger and without causing the seat cushion assembly 16 to pivot about the pivots.

A seat cushion lock 78 is provided to lock the seat cushion to a linkage lock 80 (see FIG. 6). The linkage lock 80 in turns locks to the track slide 48 to secure the seat cushion assembly 16 and the linkage 70, if the seat cushion lock 78 is locked, to the track slide 48, such as when the seat 10 is in the use position. To move the seat from the use position to the stadium position, the seat cushion lock is unlocked by pulling on lever 84 and the linkage lock 80 remains locked such that the seat cushion assembly 16 is free to rotate about the pivots 36 and 38 while the linkage 70 remains secured to the track slide 48 so that it can force the seat cushion assembly 16 to rotate with movement of the seat back assembly 70.

A stadium slide lever 85 is connected to an upper portion of the seat back assembly 20. The stadium slide lever 85 includes a mechanism 86, such as a cable, spring, or gear, to simultaneously unlock the recline lever 52 and the track slide lock 56 so that the seat 10 can be moved from the use position to the stadium position after the seat cushion lock 78 is unlocked and without requiring the user to separately actuate the track slide lock 56 and the recline lever 52, which can be difficult to reach and actuate if the user is attempting to move the seat 10 to the stadium position from outside the vehicle.

The flat position of FIGS. 4 and 6 illustrate a positioning of the seat 10 that can be used to access an area behind the seat without the seat back assembly 20 being in a upright position, such as if it is desirable to position items on top of the seat back assembly 20. In general, the flat position is a low profile position that corresponds with the seat cushion assembly 16 being in a substantially upright position and the seat back assembly 20 being in a substantially horizontal position. This is achieved by locking the cushion lock 78, unlocking the linkage lock 80, rotating the seat cushion assembly 16 into the upright position using manual force, folding the headrest assembly 24 forward by actuation of the headrest lock 64, and folding the seat back assembly 20 forward by actuation the recline lever 52. Preferably, in the flat position, a height of a top of the folded down backrest assembly 20 to the rails 40 and 42 is approximately equal to a height of the headrest assembly 24 folded into the position shown in FIG. 6.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat, the seat comprising:
   a seat cushion assembly;
   a seat back assembly;
   a seat track assembly for supporting the seat cushion assembly and the seat back assembly in a vehicle;
   a track pivot fixed proximate a forward end of the track assembly to pivotably secure a forward end of the seat cushion assembly to the track assembly such that the seat cushion assembly is pivotable about the track pivot;
   a track slide secured between the seat track assembly and the seat back assembly and slidable along the seat track assembly to move the seat back assembly fore and aft along the seat track assembly such that the track slide maintains a common elevation between the seat back assembly and the seat track assembly during fore and aft movement of the seat back assembly; and wherein the seat cushion and seat back assemblies are movable between a stadium position and a use position, the stadium position being characterized by the seat cushion assembly being pivoted upwardly about the track pivot such that the seat cushion assembly remains above a track plane defined by the seat track assembly and the seat back assembly being slid forwardly along the track assembly such that the seat cushion and seat back assemblies are each in a substantially upright position.

2. The seat of claim 1 wherein the seat cushion and seat back assemblies are moveable to a low flat position in which the seat cushion assembly is pivoted to an upright position about the track pivot and the seat back assembly is inclined forwardly about the track slide.

3. The seat of claim 2 further comprising a recline pivot connected between the seat back assembly and the track slide to control reclining and inclining of the seat back assembly.

4. The seat of claim 1 wherein the use position corresponds with the seat cushion assembly being in a generally horizontal position and the seat back assembly being in a substantially upright position, wherein the seat back assembly is moveable fore and aft in the use position.

5. The seat of claim 4 wherein the seat back assembly is moveable in the use position from a rearward aft position to a forward fore position over a distance of at least 100 millimeters.

6. A vehicle seat, the seat comprising:
a seat cushion assembly;
a seat back assembly;
a seat track assembly for supporting the seat cushion assembly and the seat back assembly in a vehicle;
a track pivot fixed proximate a forward end of the track assembly to pivotably secure a forward end of the seat cushion assembly to the track assembly such that the seat cushion assembly is pivotable about the track pivot;
a track slide secured between the seat track assembly and the seat back assembly and slidable along the seat track assembly to move the seat back assembly fore and aft along the seat track assembly such that the track slide maintains securement between the seat back assembly and the seat track assembly during fore and aft movement of the seat back assembly; and
wherein the seat cushion and seat back assemblies are movable between a stadium position and a use position, the stadium position being characterized by the seat cushion assembly being pivoted upwardly about the track pivot and the seat back assembly being slid forwardly along the track assembly such that the seat cushion and seat back assemblies are each in a substantially upright position;
wherein the seat cushion and seat back assemblies are moveable to a low flat position in which the seat cushion assembly is pivoted to an upright position about the track pivot and the seat back assembly is inclined forwardly about the track slide;
a headrest connected about a headrest pivot to the seat back assembly such that the headrest is pivotable about the seat back assembly, wherein the headrest folds forwardly about the seat back assembly in the low flat position.

7. The seat of claim 6 wherein a height of the back assembly relative to the seat track assembly is approximately equal to a height of the headrest when folded forwardly in the low flat position.

8. A vehicle seat, the seat comprising:
a seat cushion assembly;
a seat back assembly;
a seat track assembly for supporting the seat cushion assembly and the seat back assembly in a vehicle;
a track pivot fixed proximate a forward end of the track assembly to pivotably secure a forward end of the seat cushion assembly to the track assembly such that the seat cushion assembly is pivotable about the track pivot;
a track slide secured between the seat track assembly and the seat back assembly and slidable along the seat track assembly to move the seat back assembly fore and aft along the seat track assembly such that the track slide maintains securement between the seat back assembly and the seat track assembly during fore and aft movement of the seat back assembly;
wherein the seat cushion and seat back assemblies are movable between a stadium position and a use position, the stadium position being characterized by the seat cushion assembly being pivoted upwardly about the track pivot and the seat back assembly being slid forwardly along the track assembly such that the seat cushion and seat back assemblies are each in a substantially upright position
a linkage connected between the seat cushion assembly and the track slide such that the linkage pivots the seat cushion assembly forwardly about the track pivot to the upright position with forward movement of the track slide during a transition from the use position to the stadium position; and
wherein the linkage slides within a seat cushion track.

9. The seat of claim 8 further comprising a linkage lock for locking the linkage to the track slide, wherein the linkage lock is locked to the track slide in the use and stadium positions and wherein the linkage lock is unlocked from the track slide in a flat position, the flat position corresponding with the seat cushion assembly being pivoted to an upright position about the track pivot and the seat back assembly being inclined forwardly about the track slide.

10. The seat of claim 9 further comprising a seat cushion lock for locking the seat cushion assembly to the linkage lock, wherein the seat cushion lock is locked to the linkage lock in the use and flat positions and wherein the seat cushion lock is unlocked from the linkage lock in the stadium position.

11. A vehicle seat, the seat comprising:
a seat cushion assembly;
a seat back assembly;
a seat track assembly for supporting the seat cushion assembly and the seat back assembly in a vehicle;
a track pivot fixed proximate a forward end of the track assembly to pivotably secure a forward end of the seat cushion assembly to the track assembly such that the seat cushion assembly is pivotable about the track pivot;
a track slide secured between the seat track assembly and the seat back assembly and slidable along the seat track assembly to move the seat back assembly fore and aft along the seat track assembly such that the track slide maintains a common elevation between the seat back assembly and the seat track assembly during fore and aft movement of the seat back assembly; and a linkage connected between the seat cushion assembly and the track slide, the linkage being configured to pivot the seat cushion assembly forwardly about the track pivot to an upright position with forward movement of the seat back assembly.

12. The seat of claim 11 wherein the linkage slides within a seat cushion track.

13. The seat of claim 11 wherein the seat cushion and seat back assemblies are movable between a stadium position and a use position, the stadium position corresponding with the seat cushion assembly pivoting upwardly about the track pivot and the seat back assembly sliding forwardly along the track assembly such that the seat cushion and seat back assemblies are in a substantially upright position.

14. The seat of claim 13 further comprising a linkage lock for locking the linkage to the track slide, wherein the linkage lock is locked to the track slide in the use and stadium positions and wherein the linkage lock is unlocked from the track slide in a flat position, the flat position corresponding with the seat cushion assembly being pivoted to an upright position about the track pivot and the seat back assembly being inclined forwardly about the seat back track portion.

15. The seat of claim 14 further comprising a seat cushion lock for locking the seat cushion assembly to the linkage lock, wherein the seat cushion lock is locked to the linkage lock in the use and flat positions and wherein the seat cushion lock is unlocked from the linkage lock in the stadium position.

16. A vehicle seat, the seat comprising:
a seat cushion assembly;
a seat back assembly;
a seat track assembly for supporting the seat cushion assembly and the seat back assembly in a vehicle;
a track pivot fixed proximate a forward end of the track assembly to pivotably secure a forward end of the seat cushion assembly to the track assembly such that the seat cushion assembly is pivotable about the track pivot;
a track slide secured between the seat track assembly and the seat back assembly and slidable along the seat track assembly to move the seat back assembly fore and aft along the seat track assembly such that the track slide maintains securement between the seat back assembly and the seat track assembly during the fore and aft movement of the seat back assembly, wherein the seat cushion and seat back assemblies are movable between a stadium position and a use position, the stadium position being characterized by the seat cushion assembly being pivoted upwardly about the track pivot and the seat back assembly being slid forwardly along the track assembly such that the seat cushion and seat back assemblies are each in a substantially upright position;
a linkage connected between the seat cushion assembly and the track slide, the linkage being configured to pivot the seat cushion assembly forwardly about the track pivot to the upright position with forward movement of the track slide during a transition from the use position to the stadium position;
a linkage lock for locking the linkage to the track slide, wherein the linkage lock is locked to the track slide in the use and stadium positions, and wherein the linkage lock is unlocked from the track slide when the seat assembly is in a flat position, the flat position being characterized by the seat cushion assembly being pivoted to an upright position about the track pivot and the seat back assembly being inclined forwardly about the track slide; and
a seat cushion lock for locking the seat cushion assembly to the linkage lock, wherein the seat cushion lock is locked to the linkage lock in the use and flat positions and wherein the seat cushion lock is unlocked from the linkage lock in the stadium position.

17. The seat of claim 16 further comprising a headrest connected about a headrest pivot to the seat back assembly such that the headrest is pivotable about the seat back assembly, wherein the headrest folds forwardly about the seat back assembly in the flat position.

18. The seat of claim 16 wherein the use position corresponds with the seat cushion assembly being in a generally horizontal position and the seat back assembly being in a substantially upright position, wherein the seat back assembly is moveable fore and aft in the use position.

19. The seat of claim 18 wherein the seat back assembly is moveable in the use position from a rearward aft position to a forward fore position of at least a distance of 100 millimeters.

* * * * *

UNITED STATES PATENT AND TRADEMARK OFFICE
CERTIFICATE OF CORRECTION

PATENT NO. : 7,152,921 B2 Page 1 of 1
APPLICATION NO. : 10/920892
DATED : December 26, 2006
INVENTOR(S) : Mohammad Saberan It is certified that error appears in the above-identified patent and that said Letters Patent is hereby corrected as shown below:

Column 7, Line 21, Claim 14:

Delete "seat back track portion" and insert therefor -- track slide --.

Signed and Sealed this

Twenty-seventh Day of March, 2007

JON W. DUDAS
*Director of the United States Patent and Trademark Office*